United States Patent
Mizuta

[11] Patent Number: 5,593,362
[45] Date of Patent: Jan. 14, 1997

[54] CARRIER STRUCTURE FOR PLANETARY GEAR SYSTEM

[75] Inventor: Muneo Mizuta, Fuji, Japan

[73] Assignee: Jatco Corporation, Fuji, Japan

[21] Appl. No.: 429,497

[22] Filed: Apr. 26, 1995

[51] Int. Cl.$^6$ .................................................. F16H 1/28
[52] U.S. Cl. .................................................. 475/348
[58] Field of Search .................................................. 475/348

[56] References Cited

U.S. PATENT DOCUMENTS

| | | | |
|---|---|---|---|
| 3,344,689 | 10/1967 | Nauman | 475/348 |
| 4,776,237 | 10/1988 | Premiski et al. | 475/348 |
| 5,188,576 | 2/1993 | Maguire et al. | 475/348 |
| 5,302,160 | 4/1994 | Fujioka | 475/348 |
| 5,356,352 | 10/1994 | Sakamoto et al. | 475/348 |
| 5,368,528 | 11/1994 | Farrell | 475/348 |

*Primary Examiner*—Dirk Wright
*Attorney, Agent, or Firm*—Foley & Lardner

[57] ABSTRACT

A carrier structure for a planetary gear system has a pinion shaft rotatably supporting a pinion gear, a carrier body fixedly supporting the pinion shaft, needles disposed between an internal periphery of the pinion gear and an external periphery of the pinion shaft, a pinon washer disposed between each end face of the pinion gear and the carrier body and mounted on the pinion shaft for supporting thrust load of the pinion gear, and a support portion provided in the pinion washer for supporting the thrust load of the needles. The pinion washer has sliding surfaces mating with the pinion gear and the carrier body, to respectively. At least one of the sliding surfaces is provided with a plain bearing member. When the pinion gear is rotated, the thrust of the needles can be born by the support portion of the pinon washer. Also, when the pinion gear is rotated, the portion to slid about the support portion is the end face of the needle, the external peripheral surface of the pinion shaft and the internal peripheral surface of the pinion gear.

8 Claims, 5 Drawing Sheets

CARRIER STRUCTURE FOR PLANETARY GEAR SYSTEM

BACKGROUND OF THE INVENTION

1. Field of the Invention

The present invention relates to a carrier structure for a planetary gear system applicable for an automatic transmission of an automotive vehicle.

2. Description of the Related Art

A planetary gear system includes a sun gear as an external gear, a ring gear as an internal gear and pinion gears meshing with the sun gear and the ring gear and rotatably supported on a carrier. When such a planetary gear system is employed in an automatic transmission, a predetermined transmission ratio is established by fixing one of the sun gear, the internal gear and the carrier, for example.

Figure 13:
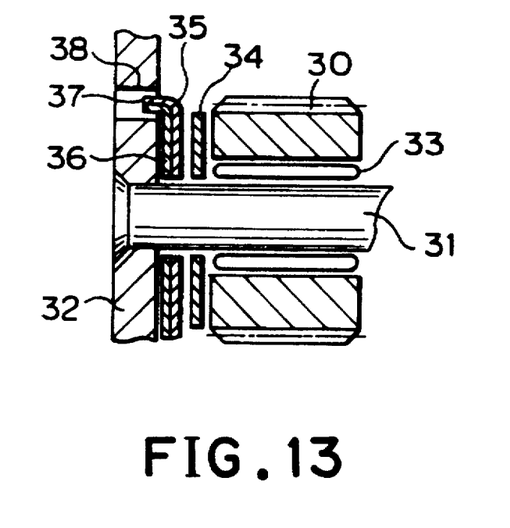
FIG. 13 is a partially omitted section of the carrier structure of the conventional planetary gear system.
Figure 14:
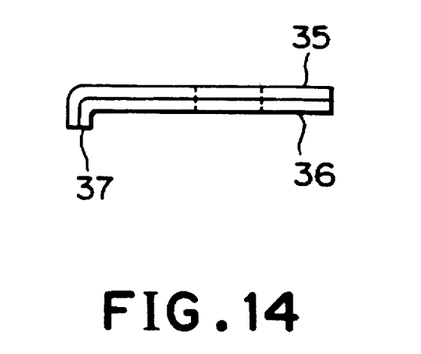
FIG. 14 is a side elevation of a locking washer to employed in the carrier structure; of FIG. 13
Figure 15:
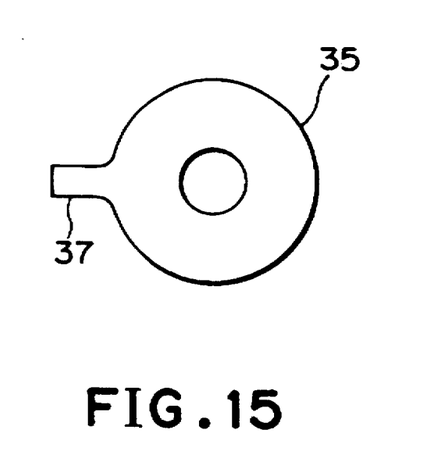
FIG. 15 is a plan view of the locking washer of FIG. 13.

One example of the carrier structure of the planetary gear system is partially illustrated in FIG. 13. As shown, the carrier structure includes a pinion shaft 31 rotatably supporting a pinion gear 30, a carrier body 32 fixedly supporting the pinion shaft 31, needle bearings 33 interposed between the internal periphery of the pinion gear 30 and the external periphery of the pinion shaft 31. Between opposite end faces of the pinion gear 30 and the carrier body 32, a plain washer 34 and a locking washer 36 provided with a plain bearing member 35 on a sliding surface are interposed. A tip end of a locking portion 37 of the locking washer 36 is bent to engage with an engaging recess portion 38 formed in the carrier body 32.

Also, a conventional carrier structure of a planetary gear system has been disclosed in Japanese Patent Application Laid-Open No. 141483/1993. In the disclosed construction, the planetary gear system includes a pinon shaft rotatably supporting a pinion gear, a carrier body fixedly supporting the pinion shaft, needle bearings interposed between the inner periphery of the pinon gear and the external periphery of the pinion shaft and pinion washers disposed between opposite end faces of the pinion gear and the carrier body and fitted on the outer periphery of the pinion shaft to support the thrust load on the pinion gear. A flange extends from the inner peripheral edge of each of the pinion washers in the axial direction. The flange is inserted between the internal periphery of the pinion gear and the external periphery of the pinion shaft for bearing the thrust load of the needle bearing.

However, in the case of the carrier structure of the planetary gear system illustrated in FIG. 13, addition of the locking washer 36 should cause the locking washer 36 to slide at a rotation speed of the pinion gear 30 to make a pV (pressure×velocity) value greater. Therefore, it becomes necessary to add the plain washer 34 between the pinion gear 30 and the locking washer 36 so that sliding is caused between the pinion gear 30 and the plain washer 34 and between the plain washer 34 and the locking washer 36 to lower the pV value (particularly, average slip speed V). thus requires a greater amount of parts by addition of the plain washer and so forth to cause lowering assembling ability.

On the other hand, in the case of the carrier structure of the conventional planetary gear system as disclosed in Japanese Patent Application Laid-Open No. 141483/1993, support for the thrust load of the pinion gear is born by the pinion washer. Therefore, heat generation amount is large thus degrading durability.

SUMMARY OF THE INVENTION

In view of the problems in the prior art set forth above, it is the first object of the present invention to provide a carrier

2 structure for a planetary gear system that can reduce heat generation amount to improve durability and the number of parts to lower possibility of failure in assembling.

The second object of the present invention is to provide a carrier structure for a planetary gear system that can improve forming ability of plain bearing material and equalize quality.

The third object of the present invention is to provide a carrier structure for a planetary gear system, in which point contact is established between the end face of a pinion gear and a plain bearing to make the bearing distribution uniform.

In order to accomplish the above-mentioned and other objects, according to the first aspect of the invention, a carrier structure for a planetary gear system comprises:

a pinion shaft rotatably supporting a pinion gear;

a carrier body fixedly supporting the pinion shaft;

needle bearings disposed between an internal periphery of the pinion gear and an external periphery of the pinion shaft;

a pinon washer disposed between each end face of the pinion gear and the carrier body and mounted on the pinion shaft for supporting the thrust load of the pinion gear; the pinion washer being provided with a support portion for supporting the thrust load of the needles; and wherein the pinion washer has sliding surfaces mating with the pinion gear and the carrier body, respectively, and at least one of the sliding surface is provided with a plain bearing member.

In the preferred construction, the outer periphery portion of the plain bearing member extends radially outward beyond the outer peripheral edge of the pinion washer to cover the outer peripheral edge of the latter. Alternatively, outer periphery portion of the plain bearing member is formed into a tapered configuration. In the further alternative, outer periphery portion of the plain bearing member is formed into a stepped configuration.

With the construction set forth above, when the pinion gear is rotated, the thrust load of the needle bearings can be born by the support portion of the pinon washer. Also, when the pinion gear is rotated, the portion possible to slid about the support portion is the end face of the needles, the external peripheral surface of the pinion shaft and the internal peripheral surface of the pinion gear.

Also, supporting of the thrust load of the pinion gear is performed with the plain bearing member of the pinion washer. Therefore, opposite surfaces (front surface and reverse surface) of the pinion washer have mutually different friction coefficients. Therefore, relative slip between the carrier body and the pinion washer and relative slip between the pinion washer and the pinion gear, i.e. pV value (particularly, average slip speed V), can be lowered to permit lowering of the heat generation limit and seizure limit resulting in lowering heat generation amount and thereby improving durability.

Also, in the preferred construction, the plain bearing member has a curved surface extending from a sliding surface to outer periphery portion.

According to a second aspect of the invention, a carrier structure for a planetary gear system comprises:

a pinion shaft rotatably supporting a pinion gear;

a carrier body fixedly supporting the pinion shaft;

a needle bearing disposed between an internal periphery of the pinion gear and an external periphery of the pinion shaft;

a washer and bearing assembly disposed between each end face of the pinion gear and the carrier body and mounted on the pinion shaft, the washer and bearing assembly having a first portion supporting the thrust load of the pinion gear and a second portion supporting the thrust load of the needle bearing; and the washer and bearing assembly having a first component with a first surface mating with the pinion gear and a second component with a second surface having different friction coefficient than the first surface and mating with the carrier body.

In this case, the washer and bearing assembly may have a radial component supporting thrust load of the pinion gear and an axial component supporting thrust load of the needle bearing.

In practice, the washer and bearing assembly may comprise a pinion washer formed of a heat processed and a plain bearing member, the pinion washer serving as one of the first and second components and the plain bearing member serving as the other of the first and second components.

In a third aspect of the present invention, there is provided a pinion gear supporting structure for a planetary gear system, comprising:

a pinion carrier for supporting a pinion gear of a planetary gear system, the pinion carrier including a pinion shaft supporting the pinion gear and a carrier body fixedly supporting the pinion shaft, a plurality of needle bearings disposed between internal periphery of the pinion gear and external periphery of the pinion shaft, a washer assembly, disposed between a side face of the pinion gear and a side face of the carrier body, for supporting the thrust load of the pinion gear, and wherein the washer assembly comprises a support washer in contact with the pinion gear, and a flanged washer having a flange that extends through the internal periphery of the support washer, the flanged washer being in contact with the support washer and the carrier body, and the flange being contact with an end face of the needle bearings.

BRIEF DESCRIPTION OF THE DRAWINGS

The present invention will be understood more fully from the detailed description given herebelow and from the accompanying drawings of the preferred embodiment of the invention, which, however, should not be taken to be limitative of the present invention, but are for explanation and understanding only.

In the drawings.

DESCRIPTION OF THE PREFERRED EMBODIMENT

The preferred embodiments of a carrier structure for a planetary gear system will be discussed hereinafter with reference to the accompanying drawings, particularly to FIGS. 1 to 12. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

FIRST EMBODIMENT

Figure 1:
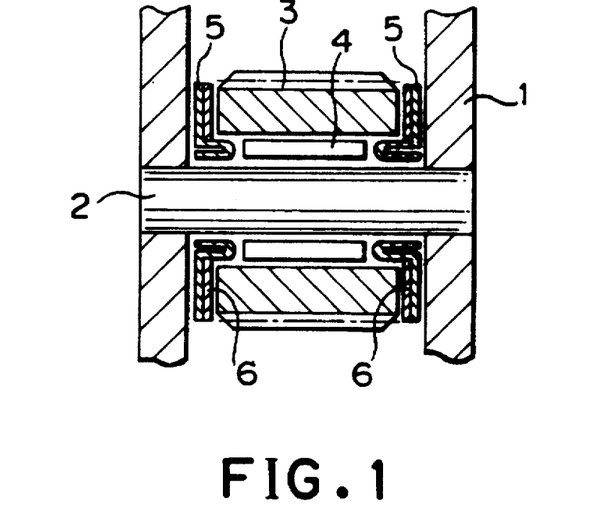
FIG. 1 is a section of the first embodimment of a carrier structure for a planetary gear system according to the present invention.

FIG. 1 shows the first embodiment of a carrier structure for a planetary gear system according to the present invention. In FIG. 1, reference numeral 1 denotes a carrier body. A pinion shaft 2 is supported and secured on the carrier body 1. The pinion shaft 2 extends through a pinion gear 3 for rotatably supporting the latter. Also, between the internal periphery of the pinon gear 3 and external periphery of the pinion shaft 2, a plurality of needle bearing are disposed.

Figure 2:
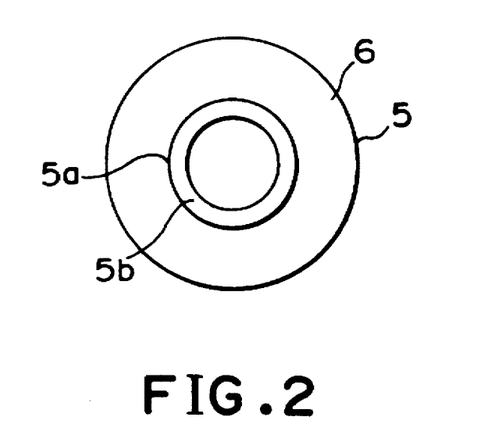
FIG. 2 is plan view of a pinion washer employed in the first embodiment of the carrier structure of FIG. 1.
Figure 3:
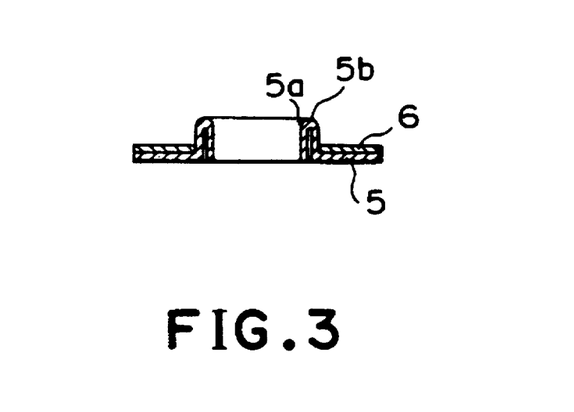
FIG. 3 is a section of the pinion washer.

Between opposite end faces of the pinion gear 3 and the carrier body 1, a pinion washer 5 made of an iron type material is disposed, respectively. Each of pinion washers 5, as shown in FIGS. 2 and 3, has a boss 5a extending from the inner peripheral edge there-of in the axial direction. The boss portion 5a is formed by inwardly turning back and overlapping. The tip end of the boss serves as a needle sliding surface 5b. Also, the pinion washer 5 is processed through heat treatment. On a sliding surface slidingly contacting with the pinion gear 3, a plain bearing member 6 (metal member) made of a copper type material is welded (or baked, soldered).

The boss 5a is disposed between the internal periphery of the pinion gear 3 and the external periphery of the pinion shaft 2 for supporting the thrust load of the needle bearings 4 on the needle bearing sliding surface 5b.

Next, discussion will be given for operation of the first embodiment of the carrier structure of the planetary gear system. When the pinion gear 3 is rotated, the thrust force of the needle bearings 4 is received by the needle bearing sliding surface 5b, 5b of the bosses 5a, 5a of the pinon washers 5, 5. Also, when the pinion gear 3 is rotated, the possible elements to slide relative to the boss 5a are the end face of the needle bearing 4, the external periphery of the pinion shaft 2 and the internal periphery of the pinion gear 3.

On the other hand, the thrust force of the pinion gear 3 is received by the plain bearing member 6 of the pinion washer 5. Since due to presence of the plain bearing 6, the pinion washer 5 has mutually different friction coefficients at both surfaces (front and back surfaces). Therefore, relative slip between the carrier body 1 and the pinion washer 5, and between the pinion washer 5 and the pinion gear 3, i.e. pV value (particularly, average slip speed V) can be lowered to permit lowering of heat generation limit and seizure limit, resulting in lowering heat generation amount to improve durability.

Also, since the pinion washer 5 has the boss 5a inserted inside of the pinion gear 3, inclination thereof can be successfully prevented to improve thrust supporting performance for the the pinion gear 3.

As a configuration of the plain bearing member 6 of the pinion washer, there are variations as illustrated in FIGS. 4, 5, 6, 7 and 8. The plain bearing member 6 shown in FIG. 4 has an outer periphery portion 6a extending outwardly from the outer peripheral edge portion 5c of the pinion washer 5 to cover the outer peripheral edge portion 5c. The outer periphery portion 6a of the plain bearing member 6 is oriented to extend perpendicularly to the sliding surface 6b of the plain bearing member 6.

Figure 5:
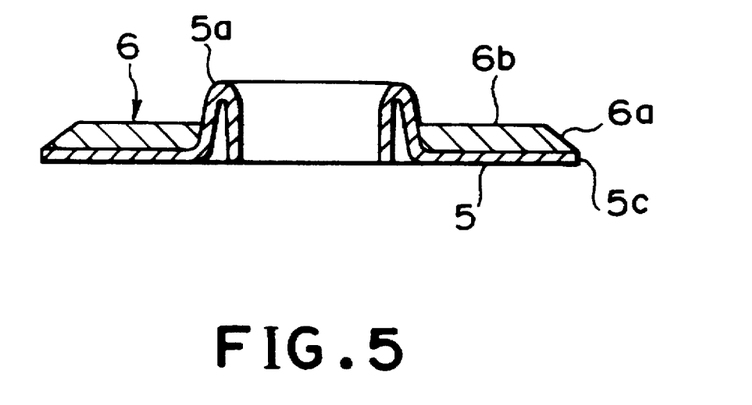
FIG. 5 is a section showing another modification of the pinion washer.

The plain bearing member 6 as illustrated in FIG. 5 has a tapered outer periphery portion 6a. Namely, the outer periphery portion 6a of the plain bearing member 6 is formed to have the same diameter as that of the outer periphery portion 5c of the pinion washer 5. The outer periphery portion 6a of the plain bearing member 6 lies oblique to the sliding surface 6b of the plain bearing member 6.

Figure 6:
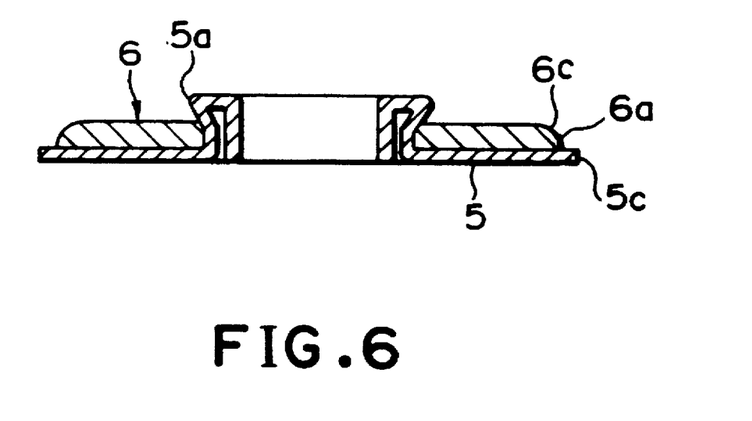
FIG. 6 is a section showing a further modification of the pinion washer.

The plain bearing member 6 of FIG. 6 has the stepped configuration of the outer periphery portion 6a. Namely, the outer periphery portion 6a is positioned at radially inside of the outer peripheral edge portion 5c of the pinion washer 5. The outer periphery portion 6a of the plain bearing member 6 is continuous to the sliding surface 6b of the plain bearing member 6 via a rounded corner portion 6c.

Figure 4:
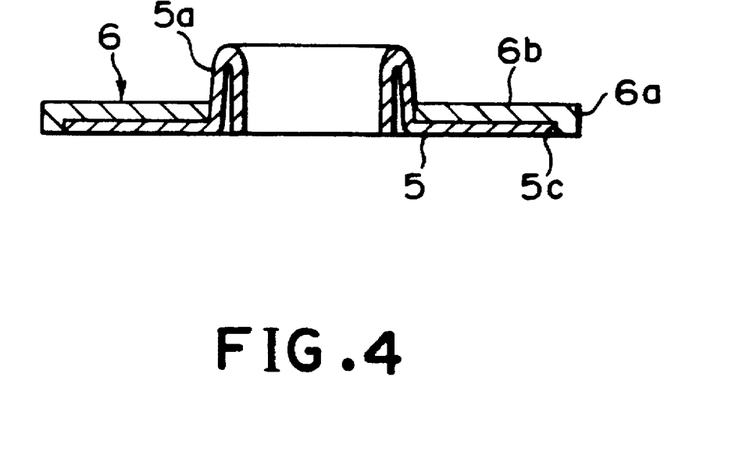
FIG. 4 is a section showing a modification of the pinion washer.

As shown in FIGS. 4, 5 and 6, the outer periphery portion 6a of the plain bearing member 6 is extended radially outward beyond the outer peripheral edge portion 5c of the pinion washer 5, formed into tapered configuration or formed into stepped configuration to improve workability in formation of the plain bearing member 6 and stability of quality.

Figure 7:
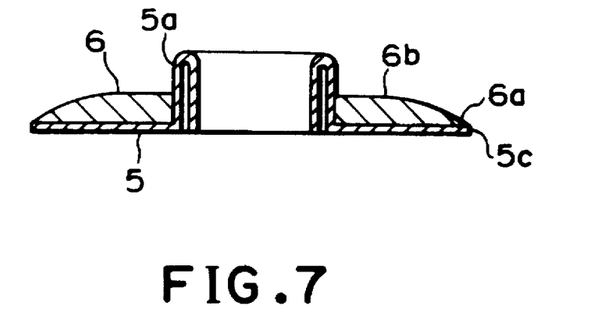
FIG. 7 is a section showing a still further modification of the pinion washer.

The plain bearing member 6 shown in FIG. 7 has a curved configuration extending from the sliding surface 6b to the outer periphery portion 6a. The outer periphery portion 6a of the plain bearing member 6 is provided with the same diameter as that of the outer peripheral edge portion 5c of the pinion washer 5.

Figure 8:
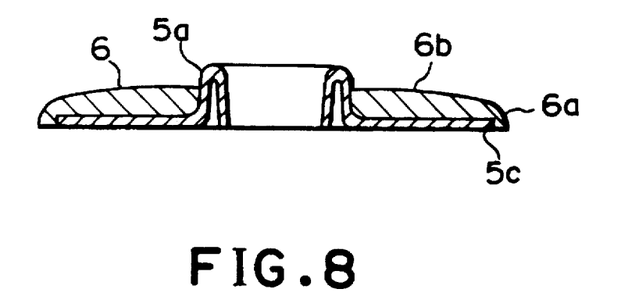
FIG. 8 is a section showing a yet further modification of the pinion washer.

The plain bearing member illustrated in FIG. 8 has a curved configuration extending from the sliding surface 6b to the outer periphery portion 6a. The outer periphery portion 6a of the plain bearing member 6 is extended radially outward beyond the outer peripheral edge portion 5c of the pinion washer 5.

Figure 9:
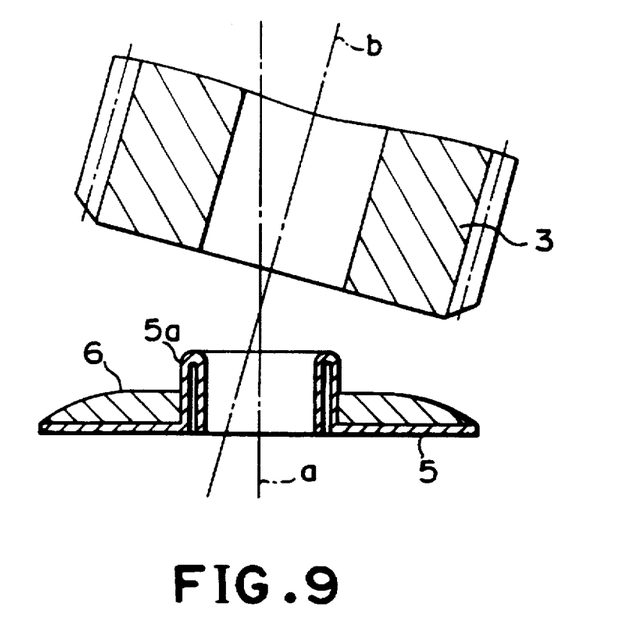
FIG. 9 is an explanatory illustration showing operation of the pinion washer illustrated in FIGS. 7 and 8.

In the case of the plain bearing member 6 having the curved configuration extending from the sliding surface 6b to the outer periphery portion 6a, when a rotational center b of the pinion gear 3 lies oblique relative to the rotational center a of the pinion washer 5, resulting in both rotational centers a and b being offset relative to each other, the end face of the pinion gear 3 contacts with the plain bearing member 6 at point to make the bearing distribution uniform.

Also, since the pinion washer 5 is processed by heat treatment, stiffness, particularly stiffness at the boss portion 5a being in contact with the needle bearing 5 can be enhanced, it may coact with the plain bearing member 6 provided on the pinion washer 5 to improve sliding ability. Thus, two kinds of design factors to be solved, i.e. slip in the axial direction and attack due to skew of the needle 4, can be successfully solved with a single piece of pinion washer 5.

SECOND EMBODIMENT

Figure 10:
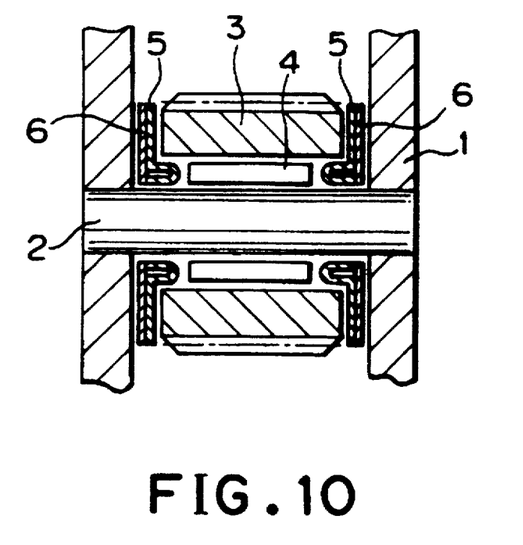
FIG. 10 is a section of the second embodiment of the carrier structure for the planetary gear system according to the invention.
Figure 11:
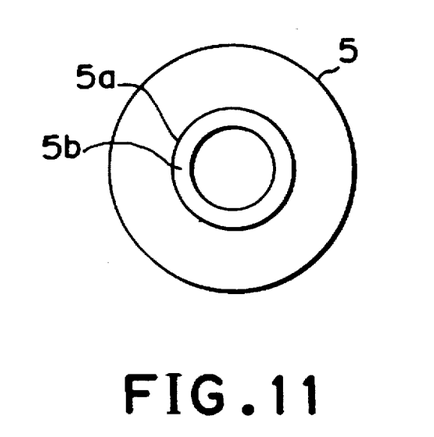
FIG. 11 is a plan view of a pinion washer to be employed in the second embodiment of the carrier structure of FIG. 10.
Figure 12:
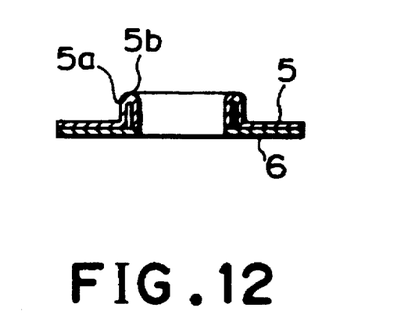
FIG. 12 is a sectional view of the pinion washer of FIG. 11.

The second embodiment of the carrier structure for the planetary gear system has been illustrated in FIGS. 10 to 12. In the shown embodiment, the pinion washer 5 has a sliding surface mating with the carrier body 1, on which the plain bearing member (metal member) of a copper type material is welded (or baked, soldered). The boss 5a is inserted between the internal periphery of the pinion gear 3 and the external periphery of the pinion shaft 2 for supporting thrust load of the needle bearings 4 with the needle bearing sliding surface 5b.

Accordingly, in a thrust support for the pinion gear 3, because of presence of the plain bearing member 6 on the pinion washer 5, the friction coefficients at opposite surfaces (front surface and reverse surface) of the pinion washer are differentiated. Therefore, relative slip between the carrier body 1 and the pinion washer and relative slip between the pinion washer 5 and the pinion gear 3, i.e. a pV value (particularly, average slip speed V) can be lowered to permit lowering of heat generation limit and seizure limit, resulting in lowering heat generation amount and thereby improving durability. It should be noted that other construction and function are the same as the first embodiment set forth above.

What is claimed is:

1. A carrier structure for a planetary gear system comprising:

a pinion shaft rotatably supporting a pinion gear;

a carrier body fixedly supporting said pinion shaft;

needle bearings disposed between an internal periphery of said pinion gear and an external periphery of said pinion shaft; and a pinion washer disposed between each end face of said pinion gear and said carrier body and mounted on said pinion shaft for supporting a thrust load of said pinion gear, wherein said pinion washer has a support portion for supporting a thrust load of said needle bearings, wherein said pinion washer has sliding surfaces for contacting said pinion gear and said carrier body, at least one of said sliding surfaces having a plain bearing member, an outer periphery portion of said plain bearing member extending radially outward beyond an outer peripheral edge of said pinion washer and covering said outer peripheral edge.

2. A carrier structure for a planetary gear system comprising:

a pinion shaft rotatably supporting a pinion gear;

a carrier body fixedly supporting said pinion shaft;

needle bearings disposed between an internal periphery of said pinion gear and an external periphery of said pinion shaft; and a pinion washer disposed between each end face of said pinion gear and said carrier body and mounted on said pinion shaft for supporting a thrust load of said pinion gear, wherein said pinion washer has a support portion for supporting a thrust load of said needle bearings, wherein said pinion washer has sliding surfaces for contacting said pinion gear and said carrier body, at least one of said sliding surfaces having a plain bearing member, an outer periphery portion of said plain bearing member being tapered.

3. A carrier structure for a planetary gear system comprising:

a pinion shaft rotatably supporting a pinion gear;

a carrier body fixedly supporting said pinion shaft;

needle bearings disposed between an internal periphery of said pinion gear and an external periphery of said pinion shaft; and a pinion washer disposed between each end face of said pinion gear and said carrier body and mounted on said pinion shaft for supporting a thrust load of said pinion gear, wherein said pinion washer has a support portion for supporting a thrust load of said needle bearings, wherein said pinion washer has sliding surfaces for contacting said pinion gear and said carrier body, at least one of said sliding surfaces having a plain bearing member, an outer periphery portion of said plain bearing member being stepped.

4. A carrier structure for a planetary gear system comprising:

a pinion shaft rotatably supporting a pinion gear;

a carrier body fixedly supporting said pinion shaft;

needle bearings disposed between an internal periphery of said pinion gear and an external periphery of said pinion shaft; and a pinion washer disposed between each end face of said pinion gear and said carrier body and mounted on said pinion shaft for supporting a thrust load of said pinion gear, wherein said pinion washer has a support portion for supporting a thrust load of said needle bearings, wherein said pinion washer has sliding surfaces for contacting said pinion gear and said carrier body, at least one of said sliding surfaces having a plain bearing member, said plain bearing member having a curved surface extending from a sliding surface to an outer periphery portion of said plain bearing member.

5. A carrier structure for a planetary gear system comprising:

a pinion shaft rotatably supporting a pinion gear;

a carrier body fixedly supporting said pinion shaft;

a needle bearing disposed between an internal periphery of said pinion gear and an external periphery of said pinion shaft; and a washer and bearing assembly disposed between each end face of said pinion gear and said carrier body and mounted on said pinion shaft, said washer and bearing assembly having a first portion supporting a thrust load of said pinion gear and a second portion supporting a thrust load of said needle bearing, wherein said washer and bearing assembly has a first component with a first surface mating with said pinion gear and a second component with a second surface having different friction coefficient than said first surface and mating with said carrier body, wherein said washer and bearing assembly comprises a pinion washer formed of a heat-treated metal and a plain bearing member, said pinion washer serving as one of said first and second components and said plain bearing member serving as the other of said first and second components, an outer periphery portion of said plain bearing member extending radially outward beyond an outer peripheral edge of said pinion washer to cover said outer peripheral edge.

6. A carrier structure for a planetary gear system comprising:

a pinion shaft rotatably supporting a pinion gear;

a carrier body fixedly supporting said pinion shaft;

a needle bearing disposed between an internal periphery of said pinion gear and an external periphery of said pinion shaft; and a washer and bearing assembly disposed between each end face of said pinion gear and said carrier body and mounted on said pinion shaft, said washer and bearing assembly having a first portion supporting a thrust load of said pinion gear and a second portion supporting a thrust load of said needle bearing, wherein said washer and bearing assembly has a first component with a first surface mating with said pinion gear and a second component with a second surface having different friction coefficient than said first surface and mating with said carrier body, wherein said washer and bearing assembly comprises a pinion washer formed of a heat-treated metal and a plain bearing member, said pinion washer serving as one of said first and second components and said plain bearing member serving as the other of said first and second components, an outer periphery portion of said plain bearing member being tapered.

7. A carrier structure for a planetary gear system comprising:

a pinion shaft rotatably supporting a pinion gear;

a carrier body fixedly supporting said pinion shaft;

a needle bearing disposed between an internal periphery of said pinion gear and an external periphery of said pinion shaft; and a washer and bearing assembly disposed between each end face of said pinion gear and said carrier body and mounted on said pinion shaft, said washer and bearing assembly having a first portion supporting a thrust load of said pinion gear and a second portion supporting a thrust load of said needle bearing, wherein said washer and bearing assembly has a first component with a first surface mating with said pinion gear and a second component with a second surface having different friction coefficient than said first surface and mating with said carrier body, wherein said washer and bearing assembly comprises a pinion washer formed of a heat-treated metal and a plain bearing member, said pinion washer serving as one of said first and second components and said plain bearing member serving as the other of said first and second components, an outer periphery portion of said plain bearing member being stepped.

8. A carrier structure for a planetary gear system comprising:

a pinion shaft rotatably supporting a pinion gear;

a carrier body fixedly supporting said pinion shaft;

a needle bearing disposed between an internal periphery of said pinion gear and an external periphery of said pinion shaft; and a washer and bearing assembly disposed between each end face of said pinion gear and said carrier body and mounted on said pinion shaft, said washer and bearing assembly having a first portion supporting a thrust load of said pinion gear and a second portion supporting a thrust load of said needle bearing, wherein said washer and bearing assembly has a first component with a first surface mating with said pinion gear and a second component with a second surface having different friction coefficient than said first surface and mating with said carrier body, wherein said washer and bearing assembly comprises a pinion washer formed of a heat-treated metal and a plain bearing member, said pinion washer serving as one of said first and second components and said plain bearing member serving as the other of said first and second components, said plain bearing member having a curved surface extending from a sliding surface to an outer periphery portion of said plain bearing member.

* * * * *

UNITED STATES PATENT AND TRADEMARK OFFICE
CERTIFICATE OF CORRECTION

PATENT NO. : 5,593,362
DATED : January 14, 1997
INVENTOR(S) : MIZUTA

It is certified that error appears in the above-indentified patent and that said Letters Patent is hereby corrected as shown below:

On the cover page, first column, insert the following:

--[30] Foreign Application Priority Date

Apr. 27, 1994   Japan ..............6-110133--

Signed and Sealed this

Twenty-second Day of July, 1997

Attest:

BRUCE LEHMAN

Attesting Officer           Commissioner of Patents and Trademarks